Nov. 29, 1966   M. R. FELLMAN   3,288,181
APPARATUS FOR CUTTING TEETH IN WOOD MEMBERS
Filed April 30, 1964   4 Sheets-Sheet 1

INVENTOR
MORTON R FELLMAN
BY
Salter & Michaelson
ATTORNEYS

Nov. 29, 1966    M. R. FELLMAN    3,288,181
APPARATUS FOR CUTTING TEETH IN WOOD MEMBERS
Filed April 30, 1964    4 Sheets-Sheet 2

INVENTOR
MORTON R. FELLMAN
BY
*Salter & Michaelson*
ATTORNEYS

Nov. 29, 1966  M. R. FELLMAN  3,288,181
APPARATUS FOR CUTTING TEETH IN WOOD MEMBERS
Filed April 30, 1964  4 Sheets-Sheet 3

INVENTOR.
MORTON R. FELLMAN
BY
ATTORNEYS

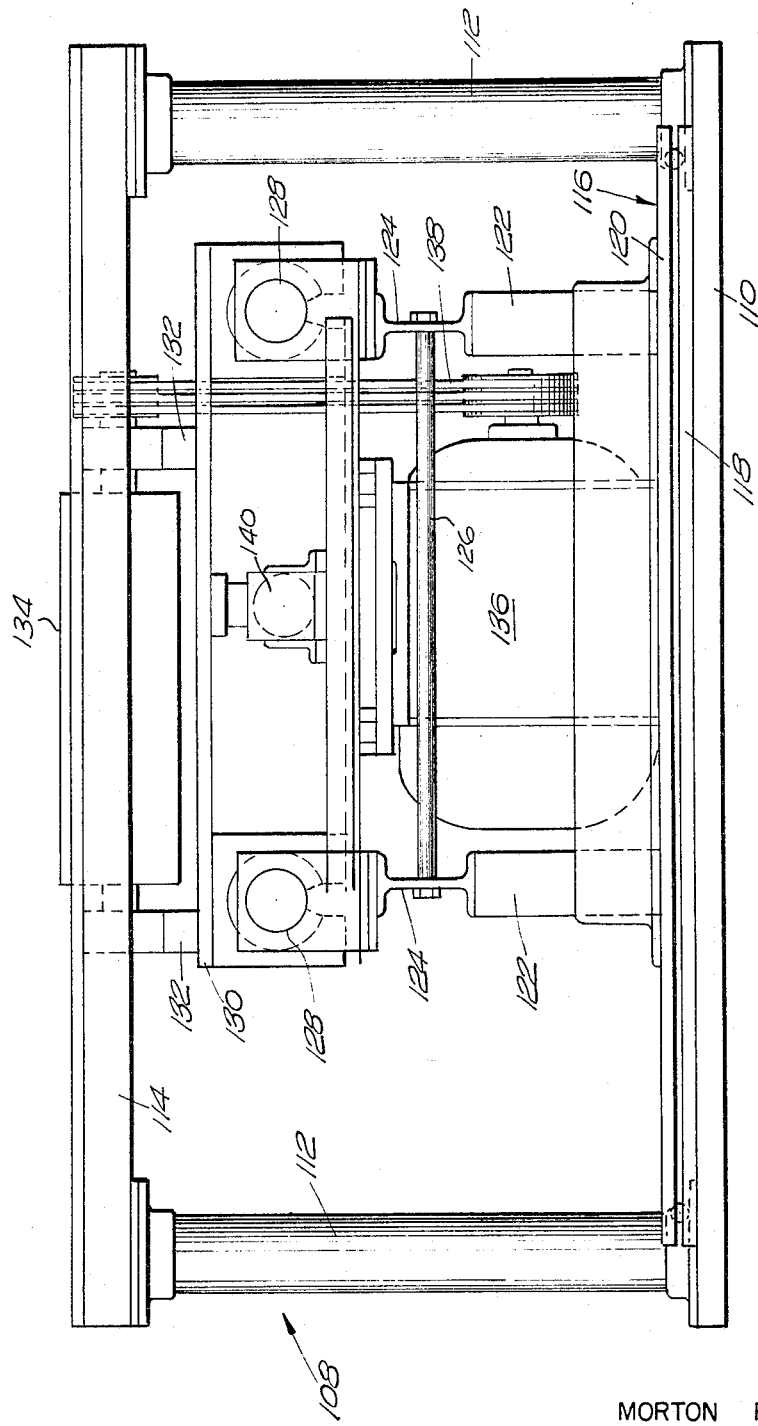

United States Patent Office 3,288,181
Patented Nov. 29, 1966

3,288,181
APPARATUS FOR CUTTING TEETH
IN WOOD MEMBERS
Morton R. Fellman, 12835 SW. 75th St., Miami, Fla.
Filed Apr. 30, 1964, Ser. No. 363,791
16 Claims. (Cl. 144—1)

The present invention relates to apparatus for cutting teeth in wood members. More particularly, the present invention relates to apparatus for cutting a plurality of teeth in the vertical side face of elongated wood members that are utilized in the construction of prefabricated roof trusses.

The apparatus embodied in the present invention has particular application in the processing of truss or chord members that are utilized in the construction of a prefabricated roof truss such as that illustrated and described in Patent No. 3,070,923, issued January 1, 1963.

As disclosed in the aforesaid Patent No. 3,070,923, each of the chord members of the structural roof truss illustrated therein is formed with a plurality of teeth of a predetermined configuration adjacent the ends and in the vertical side faces thereof. Each chord member is joined to an adjacent chord member by overlapping the ends in which the teeth are formed, the teeth of the joined chord members in the area of the overlap, being located in interlocking relation to define an interlocking joint. The interlocking teeth that are formed in the overlapping opposed faces of the chord members, thus cooperate to produce a joint that develops the full shear strength required of each of the chord members.

Since the teeth formed in the chord members of the roof truss illustrated in Patent No. 3,070,923 are especially designed to resist tension and compression forces impressed on the truss, the teeth must be cut in the side faces of the chord members such that the apices thereof extend generally vertical when the truss is mounted in the position of use. Thus, the teeth that are cut in the side faces of the chord members, are cut such that the apices thereof define an angle with respect to the longitudinal axis thereof. However, it is the slope of the truss as employed in a building construction that will determine the angle that the teeth will be cut in a chord member with respect to the longitudinal axis thereof, and accordingly the angle of the teeth as cut in the chord members of any given truss will vary depending on the slope requirements of that truss. It is for this reason that the apparatus of the present invention includes means for varying the angular relation between the longitudinal axis of the member in which the teeth are to be cut and the axis of the cutter that performs the teeth cutting operation.

Since multiple teeth are cut in the chord members adjacent the ends thereof, it is necessary that a multiple tooth cutter be incorporated in the apparatus herein. Accordingly, the apparatus embodied in the present invention includes a cutter head having a plurality of rows of cutter teeth that are shaped and designed to produce the required tooth configuration in the chord members that are utilized in the construction of the roof truss shown in Patent No. 3,070,923. The cutter head of the present invention must necessarily cut across the grain of the wood chord members, and therefore a special design for the cutter teeth is provided. Because of the unique cutting characteristics of the cutter head, the use of the apparatus of the present invention requires special techniques and procedures for clamping the chord members in place and for varying the angular relationship of the chord members with respect to the cutter head.

Accordingly, it is an object of the present invention to provide apparatus for cutting a plurality of teeth in the ends of an elongated wood member that is utilized in the construction of a roof truss.

Another object of the invention is to provide apparatus for cutting teeth of a predetermined design in a wood member.

Still another object is to provide apparatus for cutting teeth in a wood member, wherein the angle of the teeth cut in the wood member may be varied in accordance with the intended use of the wood member.

Still another object is to provide apparatus for cutting teeth in wood members that include means for positively clamping the wood members in both a vertical and lateral direction.

Still another object is to provide apparatus for cutting teeth in a wood member, wherein a cutter head is employed, the angular relationship of which may be varied with respect to the longitudinal axis of the wood member, so that the angle of the teeth that are cut in the wood member may be predetermined.

Still another object is to provide an overhead cutter for cutting teeth in the upper surface of wood members that are used in the construction of a prefabricated roof truss.

Still another object is to provide a cutter head that is mounted for movement below a clamped wood member and that is designed to cut teeth in the undersurface of the wood member.

Still another object is to provide wood cutting apparatus that includes a pivotal table for varying the angular position of a wood member in which a plurality of teeth are to be cut.

Still another object is to provide apparatus for cutting teeth in a wood member that includes a cutter head that is adapted to be pivotally adjusted with respect to a clamped wood member for varying the angular relationship of teeth that are cut in the wood member by the cutter head.

Other objects, features and advantages of the invention will become apparent as the description thereof proceeds when considered in connection with the accompanying illustrative drawings.

In the drawings which illustrate the best mode presently contemplated by me for carrying out my invention:

FIG. 9 is an end elevational view of the apparatus shown in FIGS. 7 and 8.

Figure 1:
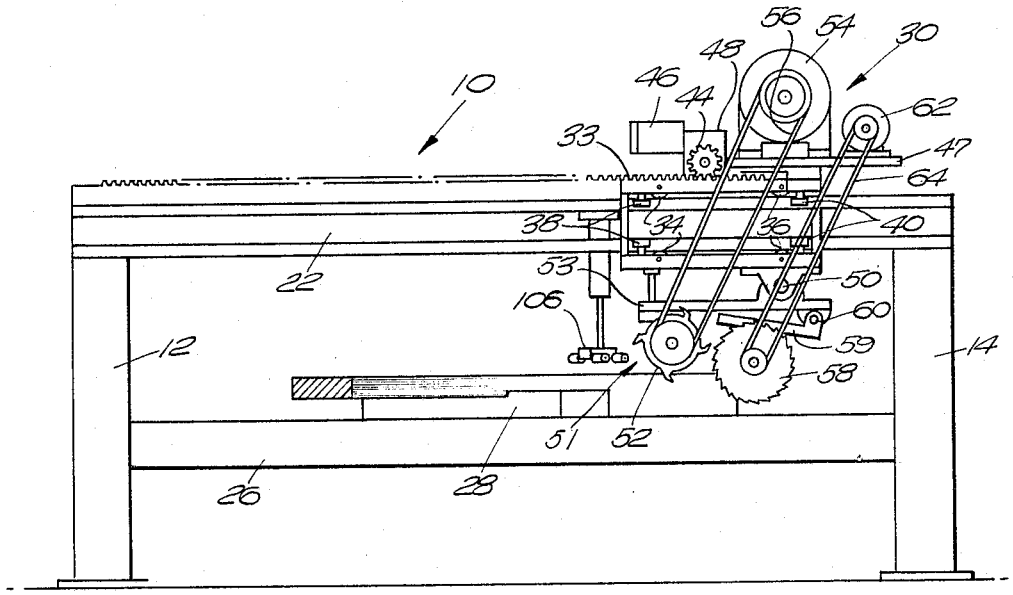
FIG. 1 is a side elevational view of one form of the apparatus embodied in the present invention.
Figure 2:
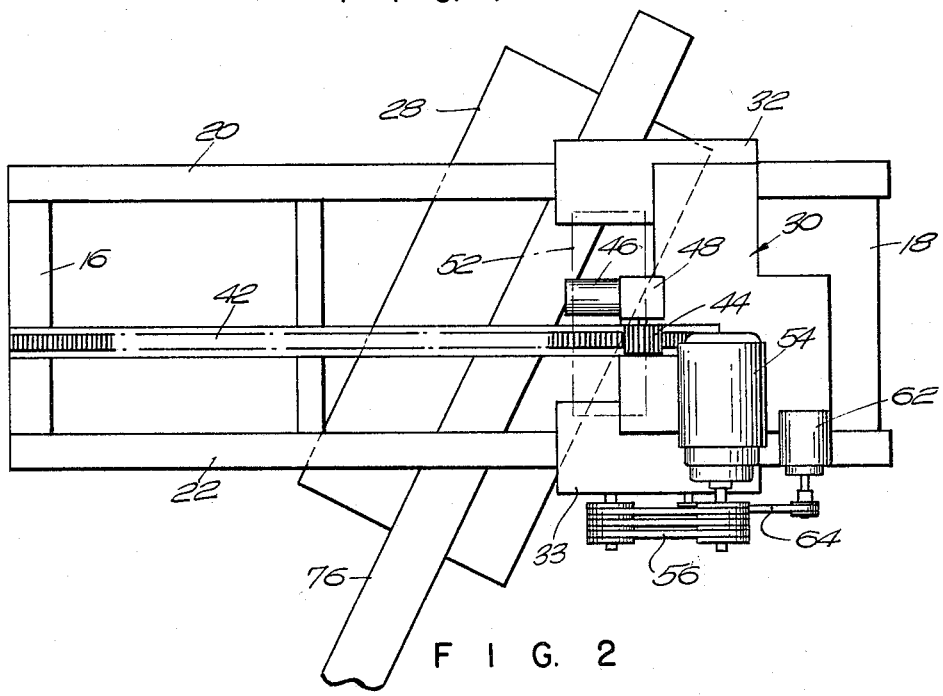
FIG. 2 is a top plan view of the apparatus illustrated in FIG. 1.

Referring now to the drawings and particularly to FIGS. 1 and 2, one form of the apparatus embodied in the present invention is illustrated and is generally indicated at 10. The apparatus 10 defines a machine for cutting teeth of a predetermined design in wood members and includes a frame comprising pairs of spaced vertical end supports 12 and 14, horizontal transverse end members 16 and 18 that are secured to the vertical supports 12 and 14 respectively, and elongated, horizontal longitudinally extending carriage supports 20 and 22 that are mounted on the vertical supports 12 and 14 and that are laterally spaced from each other. Longitudinally extending lower horizontal supports 26 and 27 which are also secured to the end supports 12 and 14 are located in aligned relation beneath the carriage supports 20 and 22 and are provided for supporting a table 28 thereon. As will be described in more detail hereinafter, the table 28 is mounted for pivotal movement on the supports 26, 27 and is adapted to support a wood member, in the upper surface of which teeth are to be cut. The pivotal movement of the table 28 is designed to adjust the angular position of the wood member carried thereon and thus is adapted to locate the wood member in a predetermined position for the cutting of teeth therein in accordance with the slope of a roof truss in which the wood member may be utilized.

Mounted on the carriage supports 20 and 22 of the machine 10 is a carriage assembly generally indicated at 30, that is movable on the carriage supports 20 and 22 during the cutting operation. The carriage assembly 30 includes spaced bearing supports 32 and 33 that envelope the carriage supports 20, 22 respectively and that are provided with pairs of spaced vertical bearing rollers 34 and 36 that engage the upper and lower surfaces of the carriage supports 20 and 22. Although only rollers 34 and 36 for bearing support 33 are shown in FIG. 1, it is understood that the bearing support 32 includes similar rollers 34 and 36. Pairs of spaced horizontal bearing rollers 38 and 40 are also mounted on the bearing supports 32 and 33 and engage the sides of the carriage supports 20 and 22 to facilitate movement of the carriage assembly 30 on the carriage supports 20 and 22. In order to provide for movement of the carriage assembly 30 on the supports 20, 22, an elongated rack 42 is provided and is mounted on the upper lateral supports of the frame of the machine. As shown in FIG. 2, the rack 42 extends over the transverse end member 16 and over a similar end member located at the opposite end of the frame. Mounted on the rack 42 for movement thereon is a pinion 44 that is operatively driven by a motor 46 that is fixed to a carriage plate 47 secured to the bearing supports 32 and 33 of the carriage assembly 30. It is seen that the carriage assembly 30 will be moved along the length of the machine 10 by operation of the motor 46 which rotates the pinion 44. The speed of the motor 46 may be reduced through a speed reducer 48 that is also mounted on the plate 47.

Pivotally secured to the underside of the carriage assembly 30 is a cutter head assembly generally indicated at 51 that includes a base 53. The base 53 is mounted for pivotal movement about an arbor 50 that is fixed to the carriage assembly 30, a cutter head 52 being journaled for rotation in the base 53. The cutter head 52 is thus mounted for vertical adjustment in accordance with the thickness of the wood members to be cut. Mounted on the plate 47 of the carriage assembly 30 is a motor 54 that is drivingly connected to the cutter head 52 through belting 56. It is seen that the cutter head assembly 51 including the cutter head 52 and the carriage assembly 30 are movable as a unit along the length of the carriage supports 20, 22 upon operation of the motor 46.

As will be described, it is necessary in certain of the operations in which teeth are cut in the wood members, to trim the end of the wood members so as to produce the required cut. For this purpose, a trim saw 58 is provided and is pivotally mounted on the cutter head assembly 51 through a plate 59 that is pivotally connected to the base 53 by a pivot connection 60. A motor 62 that is fixed to the plate 47 of the carriage assembly 30 is interconnected to the trim saw 58 through a drive belt 64 for effecting the drive thereof. The trim saw 58 is located rearwardly of the cutter head 52 and travels with the carriage assembly 30 during the cutting operation. After the cutter head 52 has formed the teeth in the wood member located on the table 28, the saw 58 trims the end of the wood member to finish the cutting operation. It will be noted that the trim saw 58 is mounted adjacent the side of the carriage assembly 30 and thus is adapted to trim only the end of the wood member in which the teeth are being cut.

Figure 3:
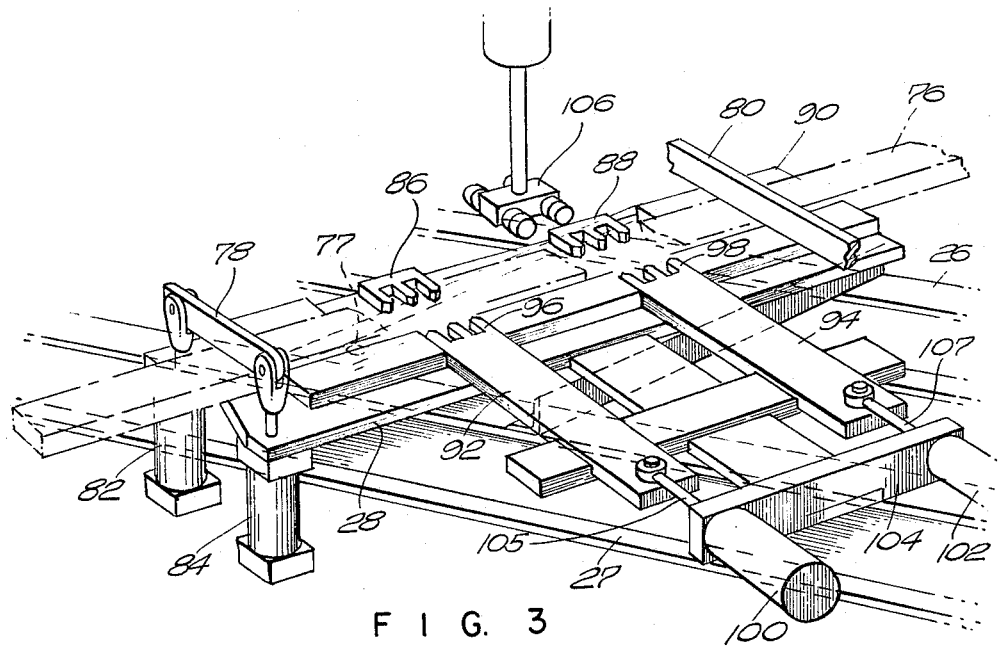
FIG. 3 is a perspective view of the pivotal table and clamping means associated therewith that are employed in the apparatus illustrated in FIGS. 1 and 2.
Figure 4:
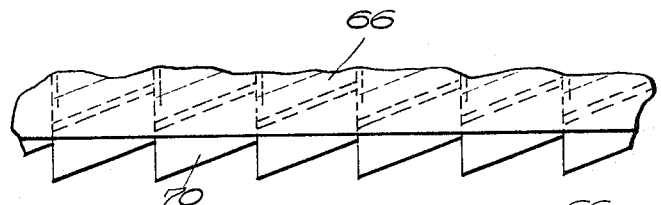
FIG. 4 is a fragmentary bottom plan view of a portion of the cutter head employed in the present invention.
Figure 5:
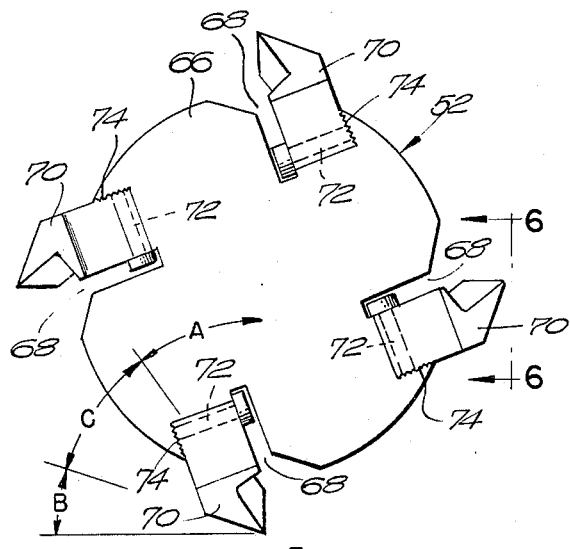
FIG. 5 is an end view of the cutter head shown in FIG. 4.
Figure 6:
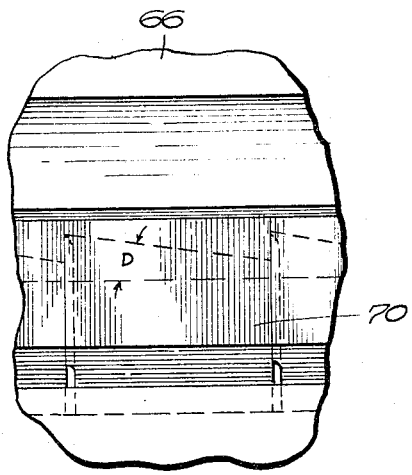
FIG. 6 is a view taken along lines 6—6 and FIG. 5.

Referring now to FIGS. 4, 5 and 6, the cutter head 52 is illustrated and as shown includes an elongated body portion 66 of generally cylindrical configuration. Formed in the body portion 66 of the cutter head are spaced elongated slots 68 in which a plurality of teeth 70 are secured. The teeth 70 are individually secured in place by jack screws 72, corrugations 74 being formed on the end of the teeth for engagement with similar corrugations that are formed in the body portion 66 of the cutter head. The configuration of the teeth 70 is especially designed to produce a saw tooth cut in the wood member that is indicated at 76 in FIGS. 2 and 3. The saw tooth configuration is the preferred form of tooth design for the truss chord members as illustrated and described in Patent No. 3,070,923. In order to produce the special saw tooth configuration of the teeth that are cut in the wood member 76, the teeth of the cutter head 52 are shaped and constructed for producing a cross-cut in the wood member; that is to say a cut that is made across the grain of the wood member. In order to produce the required cut across the grain of the wood member 76 and to obtain the special saw tooth configuration of the teeth that are cut into the wood member, the cutting angle indicated at A in FIG. 5 is approximately 35°. The clearance angle of the projecting portions of the teeth indicated at B in FIG. 5 is maintained at approximately 20°, whereas the sharpness angle also shown in FIG. 5 is maintained at approximately 35°. Because of the nature of the cut to be made in the wood member 76, the shear angle indicated in FIG. 6 at D is approximately 20°.

As previously mentioned, it is necessary that the apices of the teeth that are cut in the wood member 76 be substantially vertical when the wood member is located in the position of use in a finished roof truss. The angle that is defined by the apices of the teeth that are cut in the wood member and the longitudinal axis of the wood member will determine the slope of the truss, and therefore it is necessary that this angle be variable in accordance with the required truss slope. In order to vary the angular relation of the teeth that are cut into the wood member with respect to the longitudinal axis thereof, the table 28 is mounted for pivotal movement and the wood member 76 in which the teeth are to be cut, is clamped to the table 28 for movement therewith to the required position. Referring now to FIG. 3, the table 28 is illustrated in more detail, and as shown includes a pivotal connection 77 that is secured to the longitudinal support member 26. The table 28 is pivotally moved in any convenient manner and preferably by hand, and may be locked in place by any suitable means. The angular position of the table 28 is determined by establishing the angle that teeth are to be cut in the wood member with respect to the longitudinal axis thereof and the table is fixed in that position. The wood member 76 may then be fixed thereon and the cutting operation carried out to produce the required cut of the teeth in the wood member. The wood member 76 is firmly clamped in position on the table 28 by overhead horizontal clamps indicated at 78 and 80 in FIG. 3. The clamps 78 and 80 are located so as to engage the wood member on both sides of the table and thus are designed to firmly hold the wood member in position. The clamp 78 is operatively connected to rods that extend upwardly from air cylinders 82 and 84 and is moved downwardly thereby. Although not shown, similar air operated rods are connected to the clamp 80 for drawing the clamp 80 into engaging relation with the upper surface of the wood member 76. In order to effect a lateral clamping action of the wood member 76 so that it will remain in a rigid position during the cutting operation, fixed clamp fingers 86 and 88 are provided and are secured to a convenient backstop indicated at 90, against which the wood member 76 is braced. Movable clamp arms 92 and 94 to which clamp fingers 96 and 98 respectively are joined are adapted to be moved into engagement with the adjacent edge of the wood member 76 for clamping the wood member between the fingers 86, 96 and 88, 98. The piston rods of air operated cylinders indicated at 100 and 102 are joined to a cross bar 104 that is, in turn, connected to the clamp arms 92 and 94 through rods 105 and 107. It is seen that upon movement of the pistons within the cylinders 100 and 102, fingers 96, 98 of the clamp arms 92 and 94 will be forced into engaging relation with the edges of the wood member 76 to clamp the wood member in firm engagement prior to the cutting operation.

In operation of the apparatus illustrated in FIGS. 1, 2 and 3, the table 28 is first positioned in the proper location for producing the required cut of the teeth in the wood member 76. The wood member 76 is then placed on the table and is clamped in place by the clamps 78, 80 and clamp arms 92 and 94. A vertical clamp 106 may also be employed in the initial clamping operation to hold the wood member in place during the clamping thereof by the clamp arms 92, 94. However, prior to the cutting operation, the vertical clamp 106 is withdrawn. With the wood member 76 located in clamped position, the motor 46 is operated to translate the carriage assembly 30 in a direction toward the wood member 76 or to the left as seen in FIG. 1, and at the same time the motor 54 is operated to rotate the cutter head 52. As the cutter head 52 is moved over the wood member 76, the teeth 70 of the cutter head cut across the grain of the wood member to form a plurality of saw teeth in the upwardly facing surface thereof. The trim saw 58 which follows the cutter head 52 cuts off the end of the wood member 76 after the teeth cutting operation has been completed.

It is understood that electrical control means including switches and circuitry for use therewith may be employed to automatically operate the apparatus as described. The carriage assembly 30 will be moved in the required direction during the teeth cutting operation and upon completion thereof and the trimming operation, the carriage assembly will be automatically returned to the original position thereof. If required the position of the cutter head 52 may be vertically adjusted by movement of the cutter head assembly about the arbor 50, and the trim saw 58 may also be adjusted in a vertical direction by rotation thereof about the pivot point 60. After each wood member is cut with the required angular position of the teeth therein, the clamps 78, 80 and clamp arms 92, 94 are automatically retracted so that the wood member can be removed for further handling.

Figure 7:
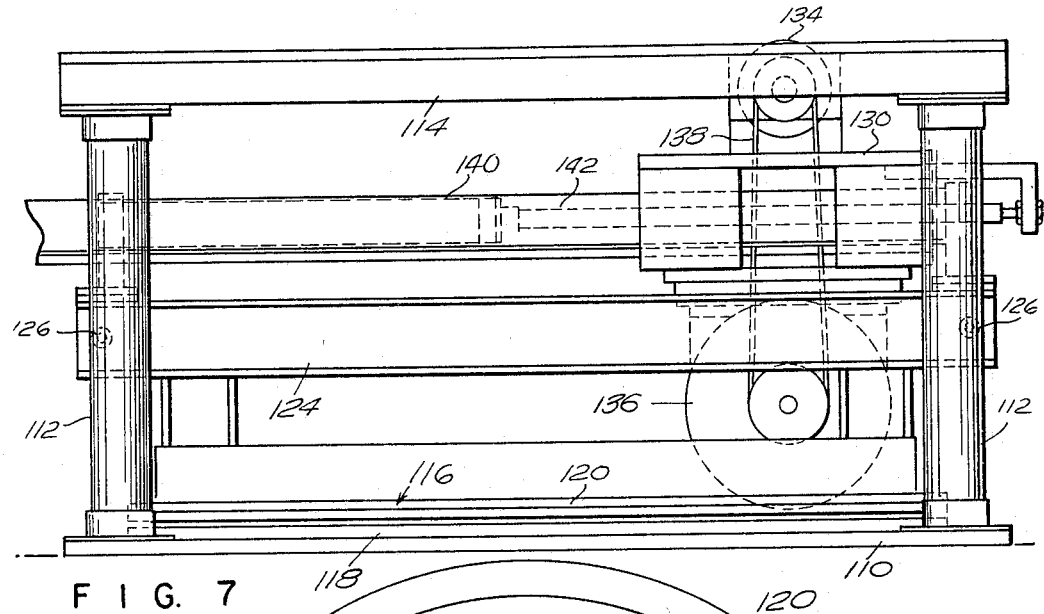
FIG. 7 is a side elevational view of a modified form of the apparatus embodied in the present invention.
Figure 8:
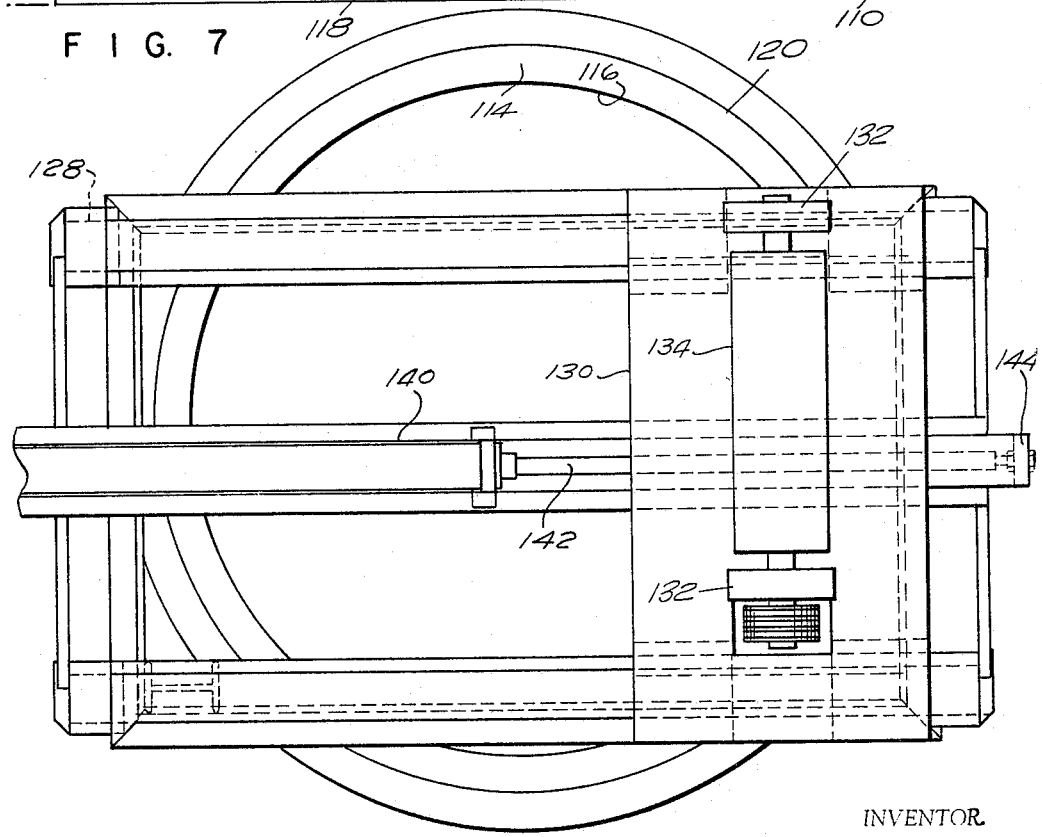
FIG. 8 is a top plan view of the apparatus illustrated in FIG. 7.

Referring now to FIGS. 7, 8 and 9, a modified form of the invention is illustrated, the apparatus as shown being generally indicated at 108. The apparatus 108 includes a base 110 on which pairs of spaced vertical standards 112 are mounted. As shown in FIG. 8, a table 114 is secured to the upper ends of the spaced vertical supports 112 and is formed with a central opening 116 therein. As will be described, a wood member in which teeth are to be cut in a side face thereof is adapted to be placed on the table 114 and will span the opening 115, thereby exposing the undersurface thereof for engagement by a cutter head, also to be further described. Although not shown herein, suitable clamping devices are provided for securing the wood member to the upper surface of the table 114, and may be of that type as described hereinabove and illustrated in FIG. 3.

Mounted on the base 110 is a turn table 116 that includes a fixed member 118 on which a member 120 is rotatably secured by means of suitable bearings. Mounted on the rotatable member 120 of the turntable 116 are longitudinally extending supports 122 that carry elongated I-beams 124 thereon. Connecting end braces 126 join the I-beams 124 for securing the I-beams in fixed spaced relation. Elongated carriage support members 128 that extend generally the length of the apparatus are mounted on the I-beams 124 and are adapted to receive a carriage assembly 130 thereon. The carriage assembly 130 is mounted for reciprocating movement on the carriage supports 128 and has mounted on an upper plate thereof, bearing supports 132 in which a cutter head 134 is rotatably mounted. In order to rotate the cutter head 134, a motor 136 is provided and is fixed to the rotatable member 120 of the turntable 116, the shaft of the motor 136 being innerconnected to the cutter head 134 by belting 138. The cutter head 134 is similar to the cutter head 52 described above and as seen in FIG. 7 is located just below the upper surface of the table 114. The teeth of the cutter head 134 project outwardly from the body portion thereof and thus are adapted to engage the undersurface of the wood member clamped to the table 114 for cutting the required teeth therein.

In order to produce movement of the cutter head 134, the carriage assembly 130 is interconnected to a cylinder 140 through a piston rod 142 and a connection 144. The piston rod 142, which may be responsive to air under pressure introduced into the cylinder 140, is movable in a timed sequence so as to produce movement of the carriage assembly 130 in a direction toward the clamped wood member that is supported on the table 114.

Instead of varying the position of the wool member with respect to the cutter head as described above, for obtaining the required angular location of the teeth that are cut in the wood member, the modified form of the invention illustrated in FIGS. 7, 8, and 9, provides for this adjustment by rotating the member 120 of the turntable 116. Since the entire carriage assembly 130 including the carriage supports 128, motor 136 and cylinder 140, are mounted on the upper rotatable member 120, rotation of this member with respect to the fixed member 118 will move the cutter head 134 to the required position with respect to the longitudinal axis of the wood member so that the teeth will be cut in the wood member in proper angular relation and in accordance with the slope requirements of the truss. The carriage assembly 130 is thus movable in a linear direction toward the fixed wood member by operation of the cylinder 140 to move the cutter head 134 therewith for producing the required cut of the teeth in the wood member Since the length of travel of the cutter head 134 is necessarily limited by the width of the wood member, it is not necessary that the cutter head 134 move beyond the confines of the opening 115. The teeth are thus cut in the undersurface of the clamped wood member in accordance with the angular requirements therefor and as determined by the slope of the truss in which the wood member is to be utilized.

Although not shown, a trim saw may also be mounted on the carriage assembly 130 for movement therewith and will trim the wood member after the teeth are cut, therein. Any additional accessory devices may also be mounted on the carriage assembly 130 for movement therewith for further processing of the wood member. It is understood that the carriage assembly 130 will be moved by the piston rod 140 at preselected intervals, the operation of the piston rod 142 being automatic and in response to any suitable, electrical, mechanical or pneumatic system.

While there is shown and described herein certain specific structure embodying the invention, it will be manifest to those skilled in the art that various modifications and rearrangements of the parts may be made without departing from the spirit and scope of the underlying inventive concept, and that the same is not limited to the particular forms herein shown and described, except insofar as indicated by the scope of the appended claims.

What is claimed is:

1. In apparatus for cutting a plurality of teeth in the ends of an elongated wood member that is utilized in the construction of a prefabricated wood truss, a table on which the wood member is supported, means for clamping said wood member in fixed position on said table, a carrier mounted for movement in a linear path toward said wood member, a cutter head mounted for rotation on said carrier and including a plurality of blades for cutting teeth of a predetermined design in said wood member, the angular relation between the longitudinal axes of said wood member and said cutter head being adjustable, wherein the angle that the teeth are cut in said wood member is variable with respect to the longitudinal axis thereof, and means for moving said carrier toward said wood member in a linear path, said cutter head being mvoable with said carrier into engagement with said wood member for cutting the teeth therein in accordance with the angle that has been preselected therefor.

2. In apparatus for cutting teeth in a wood member that is utilized in a prefabricated truss, a table on which the wood member is supported, means for clamping said wood member in fixed position on said table, a carrier mounted for movement in a direction toward said wood member, a cutter head mounted on said carrier for movement therewith, and including a plurality of blades for cutting teeth of a predetermined design in said wood member, the angular relation between the longitudinal axes of said wood member and said cutter head being adjustable, wherein the teeth are cut in said wood member in accordance with the required slope of said truss, means for rotating said cutter head, and means for moving said carrier toward said wood member, wherein said cutter head is moved into contact with said wood member for cutting the teeth of predetermined design therein.

3. In apparatus as set forth in claim 2, a circular trim saw rotatably mounted on said carrier rearwardly of said cutter head and displaced with respect to the mid-point thereof, said trim saw being movable with said carrier for severing an end of said wood member at a predetermined location after the teeth have been cut in said wood member by said cutter head.

4. In apparatus as set forth in claim 2, said cutter head including a plurality of longitudinally extending slots in which individual teeth are secured to define a plurality of cutting edges of predetermined configuration.

5. In apparatus for cutting teeth in a wood member, a table on which the wood member is supported, means for clamping said wood member in fixed position on said table, a carrier mounted for movement in a direction toward said wood member, a cutter head mounted on said carrier for movement therewith, and for cutting teeth in said wood member, the angular relation between the longitudinal axes of said wood member and said cutter head being adjustable to vary the angle that the teeth are cut in said wood member, means for rotating said cutter head, and means for moving said carrier in a direction toward said wood member, wherein said cutter head is moved into engagement with said wood member for cutting the teeth therein with a predetermined configuration and angular position.

6. In apparatus as set forth in claim 5, said cutter head being movable with said carrier into engagement with said wood member for cutting the teeth in said wood member across the grain thereof.

7. In apparatus as set forth in claim 5, said table being pivotally movable about a fixed vertical pivot connection to adjust the angular position of said wood member with respect to said cutter head, wherein said teeth are cut in said wood member by said cutter head in accordance with the angular relation of said wood member to said cutter head.

8. In apparatus as set forth in claim 7, said cutter head being mounted vertically above said table on said carrier and being movable with said carrier into engagement with the upper surface of said wood member for cutting the teeth across the grain therein.

9. In apparatus as set forth in claim 7, said clamping means being located adjacent to said table for clamping said wood member in firm position on said table, said clamping means including vertically movable clamps for exerting a vertical force on said wood member, and lateral clamps for exerting a lateral force in said wood member, said lateral clamps including a fixed clamp and a movable clamp.

10. In apparatus as set forth in claim 5, a trim saw mounted on said carrier above said wood member and rearwardly of said cutter head, said trim saw being movable with said carrier for severing an end of said wood member after the teeth have been out in said wood member by said cutter head, and means for vertically adjusting the position of said trim saw with respect to said wood member.

11. In apparatus as set forth in claim 5, said cutter head being pivotally mounted and means for adjusting the angular position of said cutter head with respect to said wood member, wherein said teeth are cut in said wood member by said cutter head in accordance with the angular relation of said wood member to said cutter head.

12. In apparatus as set forth in claim 11, said cutter head being located vertically below said wood member for cutting the teeth in the undersurface thereof, said cutter head being movable with said carrier for cutting the teeth in said wood member across the grain thereof.

13. In apparatus as set forth in claim 5, means for adjusting the angular position of said carrier and cutter head mounted thereon as a unit with respect to said wood member in order to locate said cutter head in the position for cutting the teeth in said wood member at the required angle with respect to the longitudinal axis thereof.

14. In apparatus as set forth in claim 13, said adjusting means including a turntable on which said carrier and said cutter head are mounted, said turn table being rotatable to adjust the angular position of said carrier and cutter head.

15. In apparatus as set forth in claim 5, said table including an opening over which said wood member extends, said cutter head being movable by said carrier beneath said opening for engagement with the undersurface of said wood member.

16. In apparatus as set forth in claim 14, said moving means being mounted on said turntable for movement therewith and being operatively connected to said carrier for producing movement in a linear direction toward said wood member.

References Cited by the Examiner
UNITED STATES PATENTS

| | | | |
|---|---|---|---|
| 1,796,697 | 3/1931 | White | 143—47 |
| 1,813,293 | 7/1931 | Hrncsjar | 144—133 |

WILLIAM W. DYER, Jr., *Primary Examiner.*

W. D. BRAY, *Assistant Examiner.*